US011567665B2

(12) United States Patent
Malshe et al.

(10) Patent No.: US 11,567,665 B2
(45) Date of Patent: Jan. 31, 2023

(54) DATA DISPERSION-BASED MEMORY MANAGEMENT

(71) Applicant: Micron Technology, Inc., Boise, ID (US)

(72) Inventors: Ashutosh Malshe, Fremont, CA (US); Vamsi Pavan Rayaprolu, San Jose, CA (US); Kishore K. Muchherla, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 80 days.

(21) Appl. No.: 17/007,538

(22) Filed: Aug. 31, 2020

(65) Prior Publication Data

US 2022/0066646 A1 Mar. 3, 2022

(51) Int. Cl.
*G06F 3/06* (2006.01)

(52) U.S. Cl.
CPC .......... *G06F 3/0608* (2013.01); *G06F 3/0646* (2013.01); *G06F 3/0679* (2013.01)

(58) Field of Classification Search
CPC ..... G06F 3/0608; G06F 3/0646; G06F 3/0679
See application file for complete search history.

(56) References Cited

U.S. PATENT DOCUMENTS

| | | | | |
|---|---|---|---|---|
| 7,610,437 B2* | 10/2009 | Sinclair | ................. | G06F 3/0652 711/104 |
| 7,984,084 B2* | 7/2011 | Sinclair | ............... | G06F 16/1847 707/818 |
| 8,285,918 B2* | 10/2012 | Maheshwari | ....... | G06F 12/0891 711/159 |
| 8,443,263 B2* | 5/2013 | Selinger | .............. | G06F 11/1068 714/768 |
| 8,873,284 B2* | 10/2014 | Sinclair | ............... | G06F 12/0246 365/185.11 |
| 9,223,693 B2* | 12/2015 | Sinclair | ............... | G06F 12/0246 |
| 9,336,133 B2* | 5/2016 | Sinclair | ............... | G06F 12/0246 |

(Continued)

FOREIGN PATENT DOCUMENTS

| | | | | |
|---|---|---|---|---|
| CN | 107025063 A | * | 8/2017 | ............. G06F 3/061 |
| CN | 109725853 A | * | 5/2019 | |

(Continued)

OTHER PUBLICATIONS

Avinash Arvindan, "Flash 101: NAND Flash vs NOR Flash", Jul. 23, 2018, pp. 1-8, https://www.embedded.com/flash-101-nand-flash-vs-nor-flash/ (Year: 2018).*

(Continued)

*Primary Examiner* — Christopher D Birkhimer
(74) *Attorney, Agent, or Firm* — Brooks, Cameron & Huebsch, PLLC (57) ABSTRACT

A method includes determining a respective number of and respective locations of valid data portions of a plurality of blocks of NAND memory cells, based on the respective locations of the valid data portions, determining respective dispersions of the valid data portions within the plurality of blocks of NAND memory cells, based at least on the respective dispersions, selecting a block of NAND memory cells from the plurality of blocks of NAND memory cells, and performing a folding operation on the selected block.

15 Claims, 7 Drawing Sheets

(56) References Cited

U.S. PATENT DOCUMENTS

| | | | |
|---|---|---|---|
| 9,348,746 B2* | 5/2016 | Sinclair | G06F 12/0246 |
| 9,465,731 B2* | 10/2016 | Sinclair | G06F 3/0688 |
| 9,524,236 B1* | 12/2016 | Myung | G06F 12/0246 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 10,120,613 B2* | 11/2018 | Sinclair | G06F 12/02 |
| 10,133,490 B2* | 11/2018 | Sinclair | G06F 3/0655 |
| 10,331,555 B1* | 6/2019 | Muthiah | G06F 3/0656 |
| 10,430,279 B1* | 10/2019 | Dittia | G06F 3/0656 |
| 10,545,674 B1* | 1/2020 | Shvaiger | G06F 3/061 |
| 10,983,715 B2* | 4/2021 | Sharoni | G06Q 20/105 |
| 2007/0033325 A1* | 2/2007 | Sinclair | G06F 3/0608 711/170 |
| 2008/0082596 A1* | 4/2008 | Gorobets | G06F 12/0253 |
| 2008/0189477 A1* | 8/2008 | Asano | G06F 12/0246 711/E12.008 |
| 2010/0070735 A1* | 3/2010 | Chen | G06F 12/1009 711/E12.001 |
| 2011/0145473 A1* | 6/2011 | Maheshwari | G06F 12/0873 711/E12.008 |
| 2011/0161784 A1* | 6/2011 | Selinger | G06F 11/1016 714/E11.002 |
| 2014/0231954 A1 | 8/2014 | Lue | |
| 2014/0325148 A1* | 10/2014 | Choi | G06F 3/0659 711/114 |
| 2014/0365719 A1* | 12/2014 | Kuzmin | G06F 12/0246 711/103 |
| 2016/0092122 A1* | 3/2016 | Agrawal | G06F 3/0616 711/103 |
| 2016/0179386 A1 | 6/2016 | Zhang | |
| 2016/0246713 A1* | 8/2016 | Choi | G06F 3/0608 |
| 2017/0123655 A1* | 5/2017 | Sinclair | G06F 3/061 |
| 2017/0123666 A1* | 5/2017 | Sinclair | G06F 3/0604 |
| 2017/0123682 A1* | 5/2017 | Sinclair | G06F 12/02 |
| 2017/0123726 A1* | 5/2017 | Sinclair | G06F 12/02 |
| 2017/0255550 A1* | 9/2017 | Kim | G06F 3/0608 |
| 2019/0042130 A1* | 2/2019 | Vittal Prabhu | G06F 3/0679 |
| 2019/0317694 A1* | 10/2019 | Kuo | G06F 12/0253 |
| 2019/0393267 A1* | 12/2019 | Pillarisetty | H01L 29/66666 |
| 2020/0089420 A1* | 3/2020 | Sharoni | G06F 21/79 |
| 2020/0319822 A1* | 10/2020 | Kuo | G06F 12/0246 |

FOREIGN PATENT DOCUMENTS

| | | | | |
|---|---|---|---|---|
| CN | 110390985 A | * | 10/2019 | ............ G11C 16/10 |
| WO | 2017074570 A1 | | 5/2017 | |

OTHER PUBLICATIONS

Webopedia, "What is Nand?", Dec. 16, 2004, pp. 1-4, https://www.webopedia.com/definitions/nand/(Year: 2004).*

Philip Koopman, "Main Memory Architecture", Oct. 9, 1998, pp. 1-17, https://users.ece.cmu.edu/~koopman/ece548/handouts/13m_arch.pdf (Year: 1998).*

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

DATA DISPERSION-BASED MEMORY MANAGEMENT

TECHNICAL FIELD

Embodiments of the disclosure relate generally to memory sub-systems, and more specifically, relate to data dispersion-based memory management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to data dispersion-based memory management, in particular to memory sub-systems that include a data dispersion-based memory management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Media management operations can be performed on the memory blocks. Non-limiting examples of media management operations can include error correction operations, wear leveling operations, read disturb mitigation operations, and/or garbage collection operations. Media management operations can be performed in the "foreground" (e.g., during a time when a host is utilizing an interface associated with the memory sub-system and/or in the "background" (e.g., when the host is not utilizing the interface associated with the memory sub-system). Media management operations can be referred to in the alternative as "memory management operations", herein.

A "garbage collection operation" generally refers to a process of folding data from a victim block stripe into a new destination block stripe, with the intended purpose of data consolidation to free up memory resources for subsequent program/erase cycles. As used herein, a "block stripe" generally refers to a logical grouping of memory blocks that share a same upper block number and can be accessed in parallel. However, the garbage collection operation can utilize read and write operations that result in write amplification, which can increase memory sub-system (e.g., SSD) power consumption and can decrease the lifespan of the memory sub-system, for example, since the memory cells can become unusable after experiencing a certain number of program/erase cycles. "Folding" is the migration of data from one memory device location (e.g., NAND location) to another memory device (e.g., NAND location) location independent of any direct host interaction. Folding can be performed to pack valid data together, for example, as part of garbage collection operations, which can then free more memory device storage space for operations (e.g., new writes, error avoidance operations, wear leveling operations, restoring RAIN parity protection in the event of an error).

Garbage collection operations can employ selection of a source memory block to be reclaimed by the garbage collection operation. Some previous garbage collection approaches may include tracking (e.g., via a table) a quantity of valid physical translation units (PTUs) per block (e.g., a valid translation unit count (VTC)) and then selecting a block having the lowest VTC as a source block for garbage collection. Although such approaches can result in a low amount of folding effort (e.g., lower write amplification), such approaches can be inefficient.

Efficiency (e.g., an amount of bus traffic, an amount of computing overhead, etc.) associated with a media management operation such as a garbage collection operation can vary. For instance, memory blocks can be filled with both valid data portions and invalid data portions. As used herein, "valid data portions" generally refer to data corresponding to a page having a current (e.g., up to date) logical to physical mapping entry, while "invalid data portions" generally refer to data corresponding to a page whose mapping entry is stale (e.g., the corresponding logical page has been remapped to a new physical page). Due to the behavior of write operations in the host workload memory sub-systems, the valid data portions can be dispersed at various locations within the memory block. Efficiencies associated with a media management operation can vary depending on a given dispersion of the valid data portions.

Additionally, efficiency of the media management operation can vary based on a type of media management operation (e.g., a foreground or background garbage collection operation) to be performed on the source memory block. Thus, by not accounting for data dispersion and/or a type of media management operation, the memory sub-system can experience degraded performance with approaches that use VTC as a sole criterion for source block selection. This degradation of performance can be undesirable, especially in critical applications and/or in applications in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures.

Aspects of the present disclosure address the above and other deficiencies by determining dispersions of valid data portions within memory blocks and selecting a memory block on which to perform media management operations based at least on the dispersions of valid data portions of the memory blocks. For example, in some embodiments, a memory block can be selected based at least on respective dispersions of valid data portions of the memory block and other memory blocks in a memory sub-system, and data from the selected memory block can be folded as part of performing a media management operation such as garbage collection operation. Additionally, in some embodiments, selection of a memory block can be based on a type of media management operation to be performed on the memory block. By selecting a memory block based at least on respective dispersions of valid data portions and/or a type of media management operation to be performed, memory sub-system performance can be improved in comparison to approaches in which source block selection for a media management operation is solely based on having the lowest VTC. Embodiments herein can be applied in mobile memory deployments to further improve the reliability of a memory sub-system deployed in a mobile computing architecture.

Figure 1:
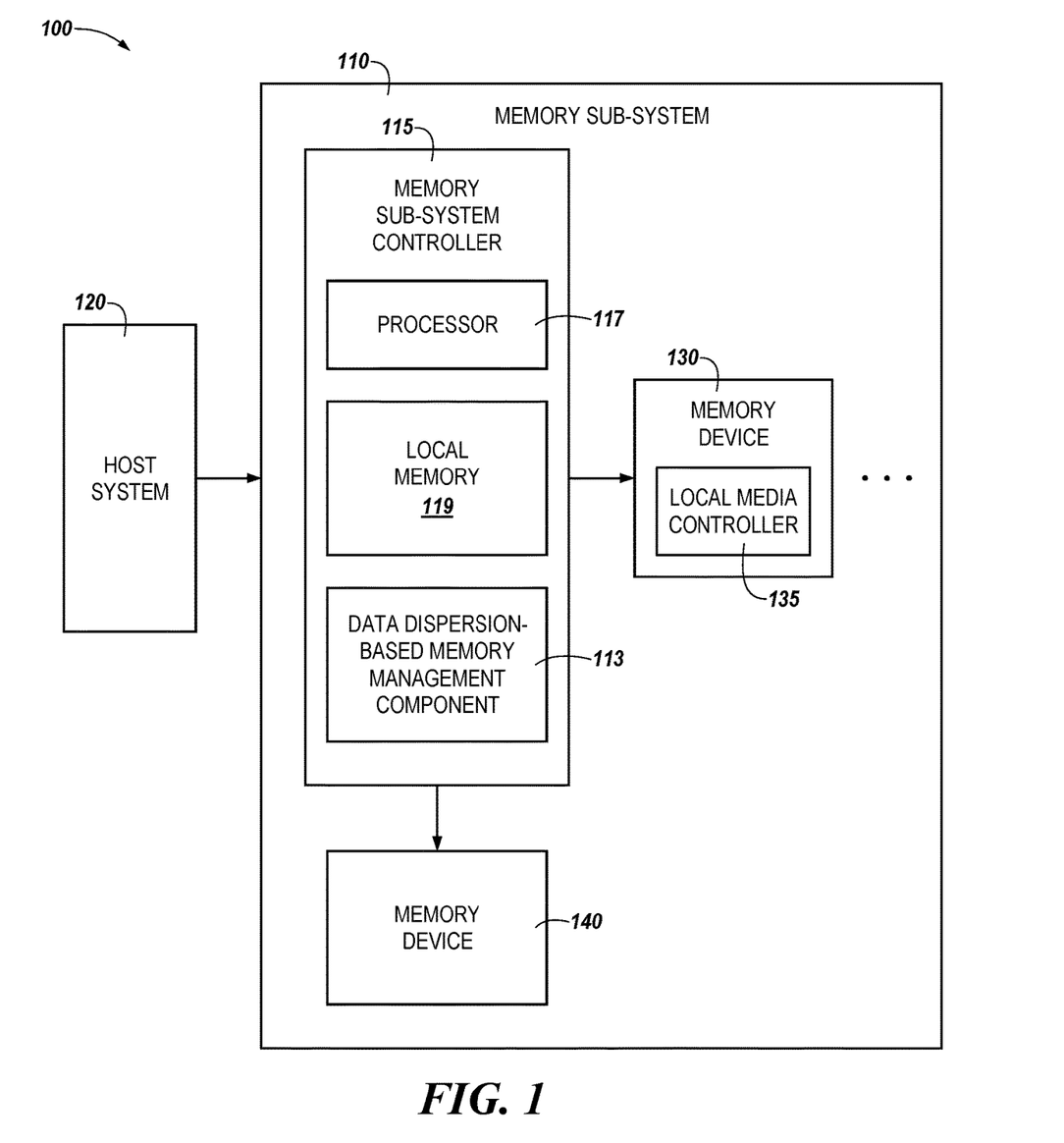
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a data dispersion-based memory management component 113. Although not shown in FIG. 1 so as to not obfuscate the drawings, the data dispersion-based memory management component 113 can include various circuitry to facilitate determining respective dispersions of valid data portions within blocks, selecting a memory block based at least on the respective dispersions, and performing a folding operation on the selected memory block. In some embodiments, the data dispersion-based memory management component 113 can include special purpose circuitry in the form of an ASIC, FPGA, state machine, and/or other logic circuitry that can allow the data dispersion-based memory management component 113 to orchestrate and/or perform operations to selectively perform media management operations for the memory device 130 and/or the memory device 140 based at least on the respective dispersions of the valid data portions.

In some embodiments, the memory sub-system controller 115 includes at least a portion of the data dispersion-based memory management component 113. For example, the memory sub-system controller 115 can include a processor 117 (processing device) configured to execute instructions stored in local memory 119 for performing the operations described herein. In some embodiments, the data dispersion-based memory management component 113 is part of the memory sub-system 110, an application, or an operating system.

In a non-limiting example, an apparatus (e.g., the computing system 100) can include a memory sub-system data dispersion-based memory management component 113. The memory sub-system data dispersion-based memory management component 113 can be resident on the memory sub-system 110. As used herein, the term "resident on" refers to something that is physically located on a particular component. For example, the memory sub-system data dispersion-based memory management component 113 being "resident on" the memory sub-system 110 refers to a condition in which the hardware circuitry that comprises the memory sub-system data dispersion-based memory management component 113 is physically located on the memory sub-system 110. The term "resident on" may be used interchangeably with other terms such as "deployed on" or "located on," herein.

The memory sub-system data dispersion-based memory management component 113 can be configured to determine a respective number of and/or respective locations of valid data portions (e.g., valid translation units) in one or more blocks of memory cells (e.g., blocks of NAND memory cells). As described above, the memory components can be memory dice or memory packages that form at least a portion of the memory device 130. In some embodiments, the blocks of memory cells can form one or more "superblocks." As used herein, a "superblock" generally refers to a set of data blocks that span multiple memory dice and are written in an interleaved fashion. For instance, in some embodiments each of a number of interleaved NAND memory blocks can be deployed across multiple memory dice that have multiple planes and/or pages associated therewith. The terms "superblock," "block," "block of memory cells," and/or "interleaved NAND memory blocks," as well as variants thereof, can, given the context of the disclosure, be used interchangeably.

In some embodiments, the memory sub-system data dispersion-based memory management component 113 can be further configured to determine respective VTCs of the blocks of memory cells. The respective VTCs can be determined based on the respective number of the valid translation units in blocks of memory cells. The VTC can be expressed as a percentage of valid translation units in a total number of translation units in an entire memory block or portion of a memory block. For instance, a respective VTC can be determined for an entire memory block of memory cells such as for all pages, planes, and dice of the block of memory cells (e.g. an entire superblock). However, in some embodiments, a VTC can be determined for a portion of, but not all of, a block of memory cells.

The memory sub-system data dispersion-based memory management component 113 can be further configured to determine respective dispersions of valid translation units in the blocks of memory cells based on the locations of the valid translation units in the block of memory cells. As used herein, a "location" of a valid data portion generally refers to an address (e.g., a physical address) of a valid translation unit. As used herein, a "respective dispersion" or "dispersion" of valid data portions (e.g., valid translation units) generally refers to a measure of the relative locations of each valid data portion in a block of memory cells. In some embodiments, a dispersion of valid translation units can be determined for an entire block (or superblock) across all pages, all planes, and/or all dice of a block of memory cells. For example, a total number of pages in a block which include at least one valid translation unit can be determined to provide a respective dispersion of the block, among other possible measures of respective dispersions.

The memory sub-system data dispersion-based memory management component 113 can be further configured to select a block of memory cells based on a respective VTC and a respective dispersion of the valid translation units of the block of memory cells. In some embodiments the memory sub-system data dispersion-based memory management component 113 can select a block of memory cells having a lowest dispersion of valid translation units and/or a lowest respective number of valid translation units (e.g., a lowest VTC), as detailed herein.

The memory sub-system data dispersion-based memory management component 113 can perform folding operations on the selected block of memory cells. For example, the memory sub-system data dispersion-based memory management component 113 can perform a media scan operation which is part of a folding operation (e.g., which is part of a garbage collection operation) on the selected block of memory cells.

In some embodiments, a candidate block pool can be maintained. As used herein, a "candidate block pool" generally refers to a group of blocks which each have a respective VTCs that are each less than a validity threshold, while a "candidate block" generally refers to a block having a VTC that is less than a validity threshold. Designation of a candidate block can include alteration of information in a table associated with the block, among other possibilities.

In some embodiments, a candidate block pool can include a first candidate block and a second candidate block. The first candidate block can have a first VTC. The second candidate block can have a second VTC that is substantially similar to the first VTC. As used herein, the term "substantially" intends that the characteristic need not be absolute, but is close enough so as to achieve the advantages of the characteristic. For example, a "substantially similar VTC" is not limited to values that are absolutely the same. For instance, the first VTC can be within 0.5%, 1%, 2%, 5%, 10%, or 20% etc. of the second VTC. In such embodiments, respective dispersions of valid translation units of the first candidate block and the second candidate block can be determined, the first block or the second block can be determined to have a lower dispersion, and either of the first candidate block or the second candidate block with the lower dispersion can be selected. As described herein, a media scan operation can be performed on the selected candidate block.

Figure 2A:
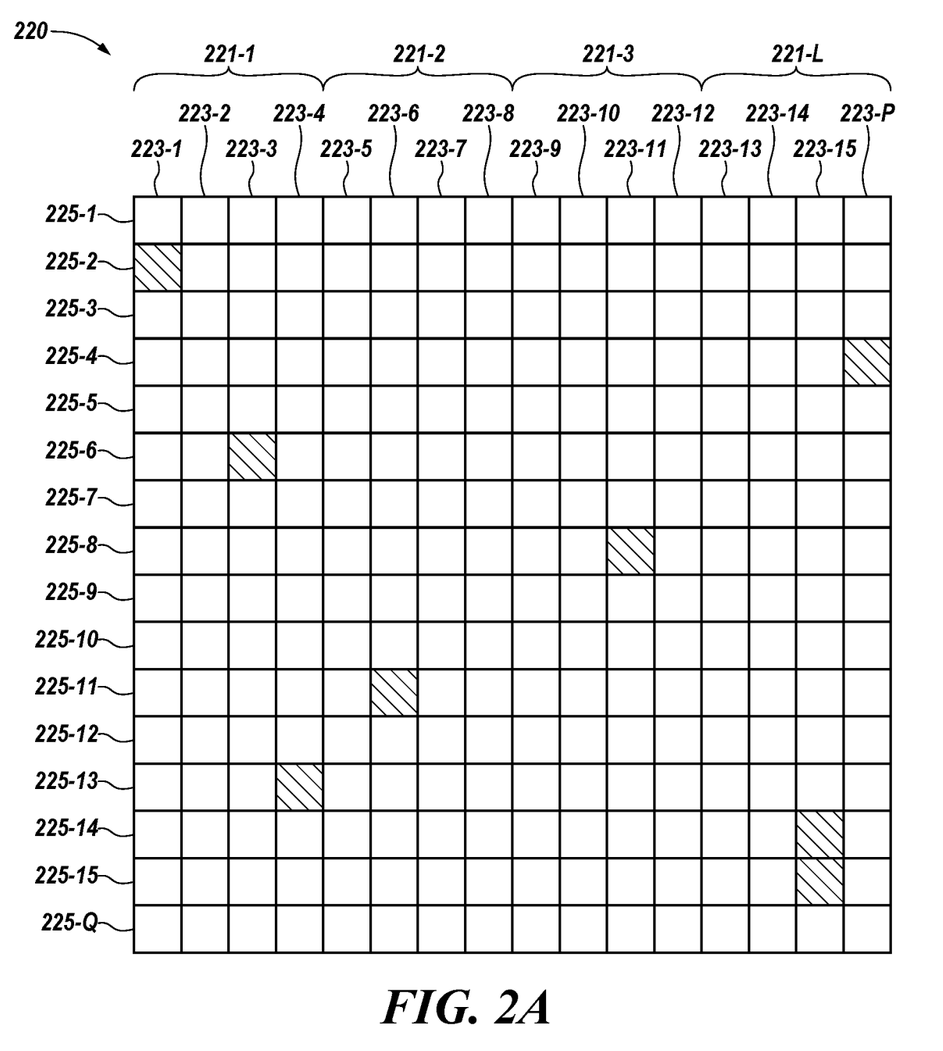
FIG. 2A illustrates an example block of memory cells in accordance with some embodiments of the present disclosure.
Figure 2B:
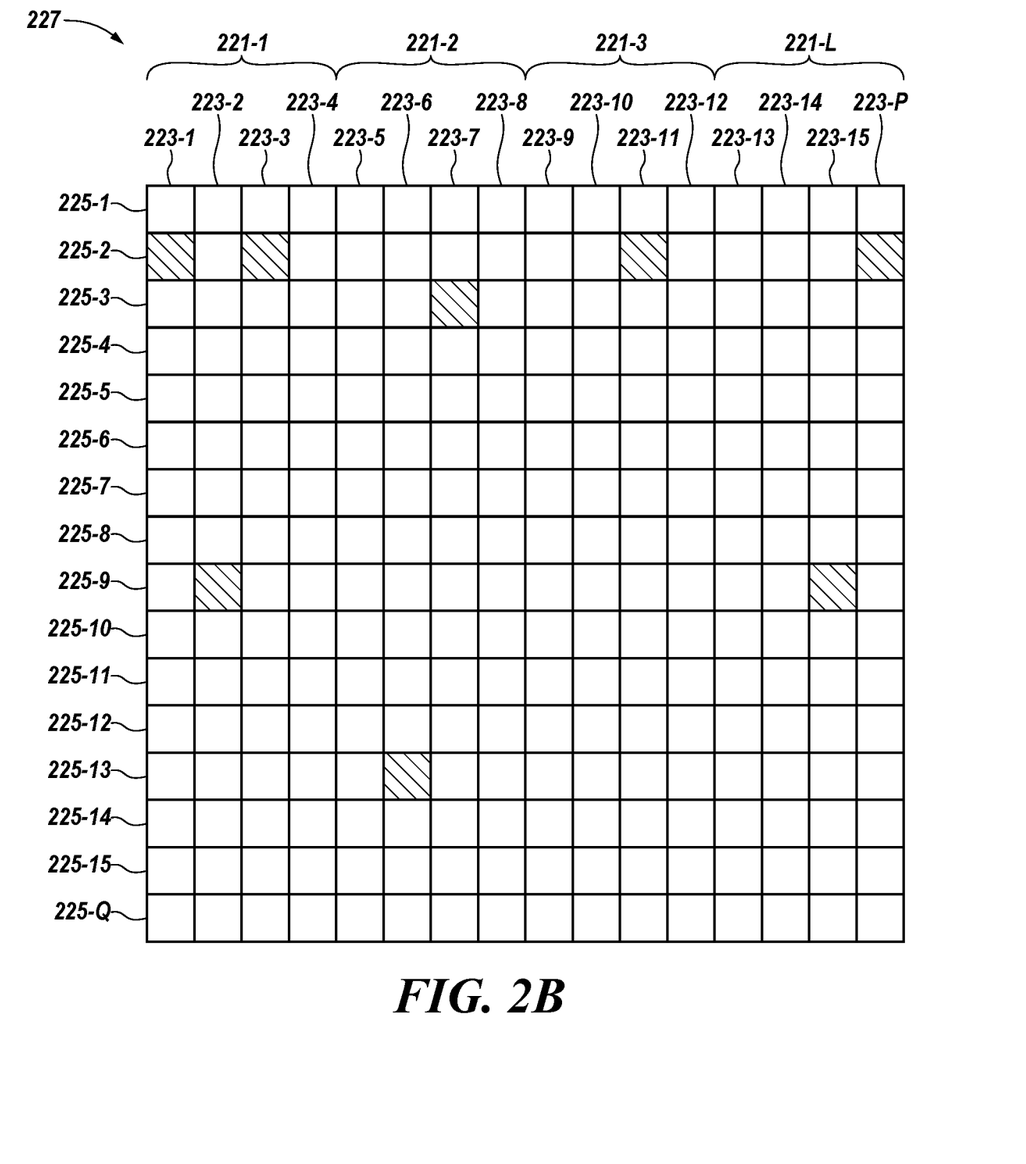
FIG. 2B illustrates another example block of memory cells in accordance with some embodiments of the present disclosure.
Figure 2C:
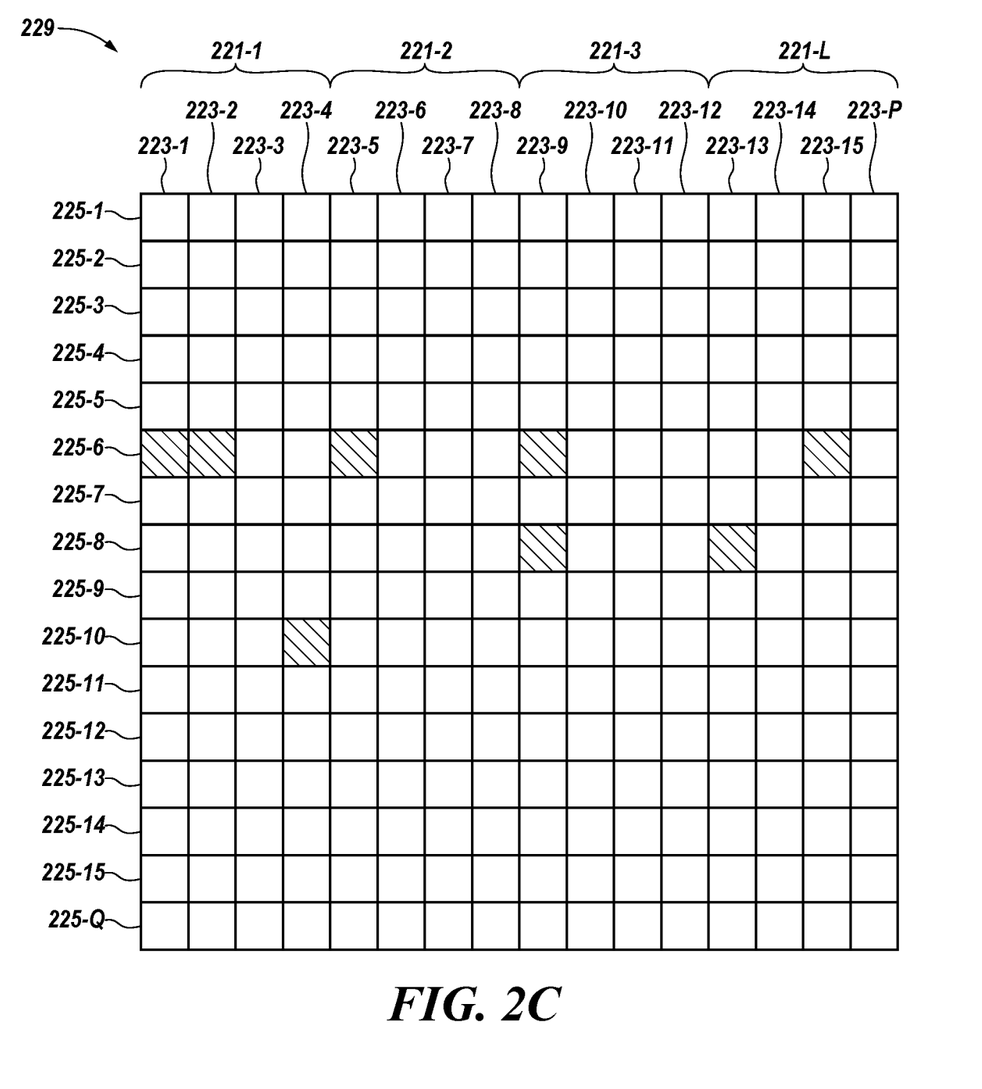
FIG. 2C illustrates yet another example block of memory cells in accordance with some embodiments of the present disclosure.

FIG. 2A, FIG. 2B, and FIG. 2C illustrate example blocks of memory cells having substantially similar VTCs (e.g., each block of memory cells has eight total valid data portions), but with different respective dispersions of valid translation units. Each of the block of memory cells in FIG. 2A, FIG. 2B, and FIG. 2C can a be a candidate block having a VTC on the order of several percent that is less than a validity threshold. In some embodiments, the blocks of memory cells illustrated in FIG. 2A, FIG. 2B, and FIG. 2C can be superblocks (e.g., interleaved blocks of NAND memory cells deployed across multiple memory dice of a memory sub-system). In some embodiments, the blocks of memory cells illustrated in FIGS. 2A-2C can include replacement-gate memory cells, although embodiments are not so limited.

FIG. 2A illustrates an example block of memory cells 220 in accordance with some embodiments of the present disclosure. As illustrated in FIG. 2A, the block of memory cells 220 can be a superblock that spans multiple memory dice 221-1 to 221-L. The block of memory cells 220 can include multiple planes 223-1 to 223-P, and multiple pages 225-1 to 225-Q.

As described above, memory cells such as those in the block of memory cells 220 can include valid data portions. For instance, as illustrated in FIG. 2A the block of memory cells 220 can include a first valid data portion (as identified by the hatched area located at die 221-1, plane 223-1, and page 225-2). Similarly, the block of memory cells 220 can include a second valid data portion (die 221-1, plane 223-3, and page 225-6), a third valid data portion (die 221-1, plane 223-4, and page 225-13), a fourth valid data portion (die 221-3, plane 223-11, and page 225-8), a fifth valid data portion (die 221-2, plane 223-6, and page 225-11), a sixth valid data portion (die 221-L, plane 223-P, and page 225-4), a seventh valid data portion (die 221-L, plane 223-15, and page 225-14), and an eighth valid data portion (die 221-L, plane 223-15, and page 225-15). That is, in the illustrative and non-limiting example shown in FIG. 2A, the block of memory cells 220 can include a total of eight distinct valid data portions, whereas a remainder of the memory cells (e.g., the memory cells having at least a different die, plane, or page number identifier than the valid data portions shown) in the block of memory cells 220 are invalid data portions.

As illustrated in FIG. 2A, the block of memory cells 220 has a high respective dispersion of the valid data portions as compared to the respective dispersions of the valid data portions in the blocks of memory cells described in FIG. 2B and FIG. 2C. For instance, each of the first, second, third, fourth, fifth, sixth, seventh, and eight valid data portions shown in FIG. 2A are located in different pages in the block of memory cells 220, whereas in FIG. 2B and FIG. 2C at least some of the valid data portions are collocated in the same page. Stated differently, the block of memory cells 220 shown in FIG. 2A has a total of 8 pages that include valid data portions, as compared to the blocks of memory cells in FIG. 2B and FIG. 2C which have fewer pages that include at least one valid data portion.

FIG. 2B illustrates another example block of memory cells 227 in accordance with some embodiments of the present disclosure, while FIG. 2C illustrates yet another example block of memory cells 229 in accordance with some embodiments of the present disclosure. As illustrated in FIG. 2B and FIG. 2C, the blocks of memory cells 227 and 229, respectively, can each be superblocks that span memory dice 221-1 to 221-L, include planes 223-1 to 223-P, and include pages 225-1 to 225-Q.

The blocks of memory cells 227 and 229 can each include valid data portions and invalid data portions. For instance, the block of memory cells 227 can include a first valid data portion (die 221-1, plane 223-1, and page 225-2), a second valid data portion (die 221-1, plane 223-3, and page 225-2), a third valid data portion (die 221-3, plane 223-11, and page 225-2), a fourth valid data portion (die 221-L, plane 223-P, and page 225-2), a fifth valid data portion (die 221-2, plane 223-7, and page 225-3), a sixth valid data portion (die 221-1, plane 223-2, and page 225-9), a seventh valid data portion (die 221-L, plane 223-15, and page 225-9), and an eighth valid data portion (die 221-2, plane 223-6, and page 225-13). That is, in the illustrative and non-limiting example shown in FIG. 2B, the first, second, third, and fourth valid data portions can be located on the same page (e.g., page 225-2), while the sixth and seventh valid data portions can each be located on the same page (page 225-9). Stated differently, the block of memory cells 227 can have a total of 5 pages which include at least one valid data portion. Thus, the block of memory cells 227 can have a respective dispersion that is less than the respective dispersion of the block of memory cells 220 described in FIG. 2A which has a total of 8 pages which include at least one valid data portion.

The block of memory cells 229 can include a first valid data portion (die 221-1, plane 223-1, and page 225-6), a second valid data portion (die 221-1, plane 223-2, and page 225-6), a third valid data portion (die 221-2, plane 223-5, and page 225-6), a fourth valid data portion (die 221-3, plane 223-9, and page 225-6), a fifth valid data portion (die 221-L, plane 223-15, and page 225-6), a sixth valid data portion (die 221-3, plane 223-9, and page 225-8), a seventh valid data portion (die 221-L, plane 223-13, and page 225-8), and an eighth valid data portion (die 221-1, plane 223-4, and page 225-10). That is, in the illustrative and non-limiting example shown in FIG. 2C, the first, second, third, fourth, and fifth valid data portions can be located on the same page (e.g., page 225-6), while the sixth and seventh valid data portions can each be located on the same page (page 225-8). Stated differently, the block of memory cells 229 can have a total of 3 pages which include at least one valid data portion. Thus, the block of memory cells 229 can have a respective dispersion that is less than the respective dispersion of the block of memory cells 220 described in FIG. 2A and less than the respective dispersion of the block of memory cells 227 described in FIG. 2B. While dispersion is described herein at least in part with respect to an total amount of pages including at least one valid data portion in FIG. 2A, FIG. 2B, and FIG. 2C, it is understood that dispersion can be determined with respect to a total number of valid data portions in dice, planes, and/or pages in blocks of memory cells.

Figure 3:
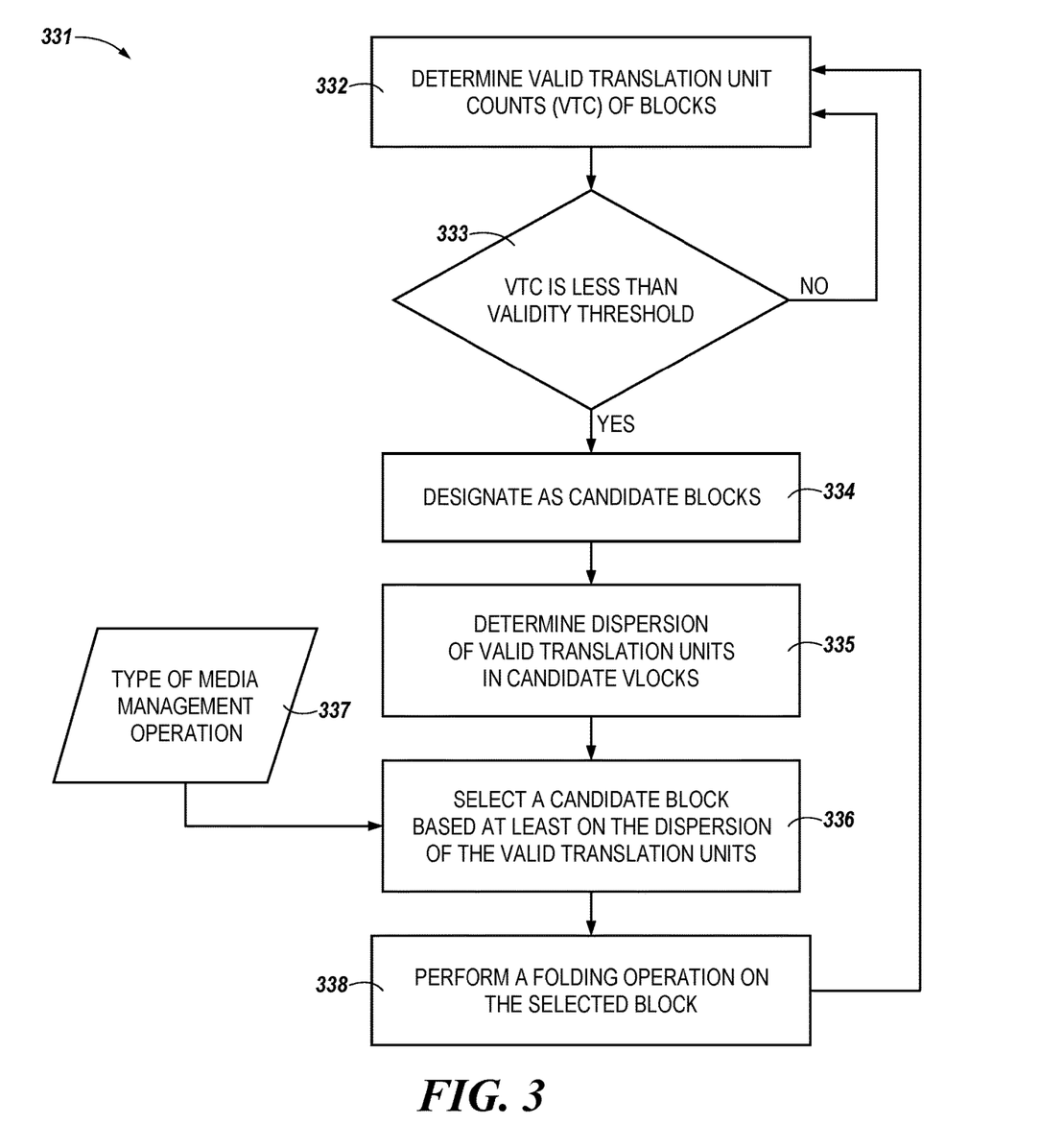
FIG. 3 is a flow diagram corresponding to data dispersion-based memory management in accordance with some embodiments of the present disclosure.

FIG. 3 is a diagram of a flow 331 corresponding to data dispersion-based memory management in accordance with some embodiments of the present disclosure. At operation 332, valid VTCs can be determined for blocks of memory cells. In some embodiments, VTCs can be determined for blocks by a memory sub-system data-dispersion memory management component, such as the data dispersion-based memory management component 113 illustrated in FIG. 1.

At operation 333, a determination can be made whether the VTC is less than a validity threshold. As used herein, a "validity threshold" generally refers to a given total number of valid translation units and/or a given amount of VTC (e.g. a given percentage) at which blocks that have a lower total number of valid translation units and/or a lower VTC can be designated as candidate blocks. In some embodiments, a validity threshold can be equal to 20%, 15%, 10% or 5%, among other possible values. If the block has a VTC that has greater than or equal to the validity threshold, the flow 331 can return to operation 332 and the VTCs of blocks can continue to be determined. If, however, it is determined that the VTC of the block is less than the validity threshold, at operation 334, the block can be designated as a candidate block.

At operation 335, dispersions of valid translation units in the candidate blocks can be determined. As described herein, a relative dispersion of valid translation units across pages, planes, and/or memory dice of a candidate block can impact folding efficiency. In some embodiments, respective dispersions can be determined for each candidate block. For instance, a dispersion can be determined for pages of a candidate block. In some other embodiments, a dispersion can be determined for planes of a candidate block. In yet other embodiments, a dispersion can be determined for memory dice of a candidate block.

At operation 336, a selection of a candidate block can be made based at least on dispersions of the valid translation units in the candidate blocks. In some embodiments, a candidate block having a lowest dispersion can be selected. Selection of the candidate block having the lowest dispersion can in turn provide improved efficiency of a folding operation and thereby result in improved foreground and/or background garbage collection efficiency. That is, selection of the candidate block based on the dispersion of valid translation units can improve efficiencies of folding operations by reducing a total number of media scan operations (e.g., read operations) in the folding operation and/or by increasing an amount of parallelism such as when performing folding operations which utilize media scan operations on blocks which include valid translation units, in comparison to approaches in which candidate blocks are not selected based on the dispersion of valid translation units detected therein.

While selection of candidate blocks can be based at least in part on an amount of dispersion, as shown in FIG. 3, in some embodiments, selection of the candidate block can be based on a type of type of media management operation to be performed on the selected candidate block, as shown at operation 337. For instance, selection of the candidate block can be based on a type of garbage collection operation to be performed on the candidate block. Examples of types of garbage collection operations can include foreground garbage collection operations (i.e., garbage collection operations performed while an I/O transaction encumbering a host such as the host system 120 illustrated in FIG. 1 is occurring) and background garbage collection operations (i.e., garbage collection operations performed in the absence of performance of an I/O transaction encumbering the host is occurring).

For instance, the media management operation can be a background garbage collection operation and a candidate block having a lowest dispersion of valid translation units can be selected. Selection of the candidate block having the lowest dispersion of valid translation units can in turn provide a higher efficiency as compared to approaches in which candidate blocks are not selected based on the dispersion of valid translation units. However, in some embodiments, the media management operation can be a foreground garbage collection operation, and a candidate block having the lowest respective number of valid translation units can be selected. Selection of the candidate block having the lowest respective number of valid translation units can reduce an amount of folding effort and therefore avoid/mitigate interference with the host system.

At operation 338, a folding operation can be performed on the selected block. As used herein, a folding operation or folding refers to the internal migration of data from one NAND location to another NAND location independent of any direct host interaction. In some embodiments, the folding operation can be part of a media management operation such as a garbage collection operation, as described above. Subsequent to performance of the folding operation, the flow 331 can return to operation 332 and VTCs of the blocks can be can continue to be determined.

Figure 4:
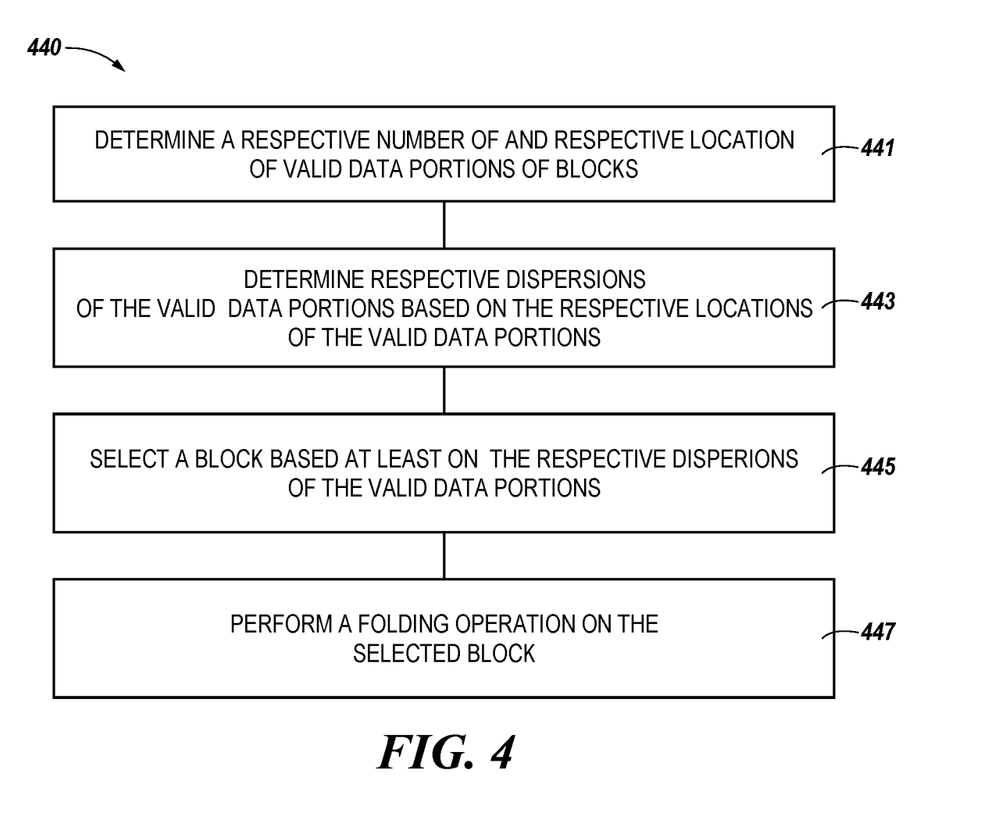
FIG. 4 is a flow diagram corresponding to a method for data dispersion-based memory management in accordance with some embodiments of the present disclosure.

FIG. 4 is flow diagram corresponding to a method 440 for data dispersion-based memory management in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the data dispersion-based memory management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 441, a respective number of and/or respective locations of valid data portions of blocks can be determined. The blocks can be blocks of memory cells such as the blocks of memory cells 220, 227, and/or 229 illustrated in FIG. 2A, FIG. 2B, and FIG. 2C, herein. In some embodiments, the method 440 can include determining a respective number of and respective locations of valid data portions of blocks of memory cells (e.g., one or more blocks of NAND memory cells) in a memory sub-system. In some embodiments, the memory sub-system can be analogous to the memory sub-system 110 illustrated in FIG. 1. As described above, the memory components can be memory dice or memory packages that are coupled to one another to create an array of memory cells, such as a three-dimensional stackable cross-gridded array of memory cells used by the memory sub-system to store data.

In some embodiments, the method 440 can include determining the respective number of and the respective locations of valid data portions by performing a media scan operation. Performing the media scan operation can include performing a Physical to logical (P2L) scan and/or an logical to physical (L2P) scan, among other possible types of scans. For instance, in some embodiments the respective number of and the respective locations of the valid data portions can be determined by performing a P2L and/or a L2P scan of a block.

At operation 443, respective dispersions of the valid data portions can be determined based on the respective locations of the valid data portions. As described above, the respective dispersions can be determined for a block by determining dispersion of the valid data portions across pages, planes, and/or dice of a block. In some embodiments, the dispersion of the valid data portions for a block can include determining dispersion of the valid data portions across each page, each plane, and/or each die of a block.

At operation 445, a block can be selected based at least on the respective dispersions of the valid data portions. For instance, in some embodiments, selection can be based on a respective VTC and a respective dispersion. For example, a blocks with respective VTCs that are less than a validity threshold can be designated as candidate blocks and added to a candidate block pool. As described above, a candidate block can be selected from the candidate block pool based on the respective dispersion of the candidate block and/or a type of media management operation to be performed on the candidate block.

At operation 447, a folding operation can be performed on the selected block. For instance, a folding operation including performing a scan operation such as a P2L scan and/or a L2P scan on some or all of the selected block at least in part by performing the media scan operation on individual block stripes (e.g., on individual page stripes) of the selected block. As used herein, a "page stripe" generally refers to the logical grouping of all pages in a LUN stripe that have the same logical block and logical page number, such that they can all be accessed in parallel. As used herein, a "LUN stripe" refers a collection of planes that are treated as one when writing, reading, or erasing NAND memory.

In some examples, a folding operation/media scan associated with the folding operation can be performed exclusively on individual block stripes which include at least one valid translation unit (as determined at operation 441). Conversely, the media scan operation is not performed on other block stripes which do not include at least one valid translation unit. Performing the folding operation/media scan operation exclusively on individual block stripes which include at least one valid translation unit can reduce an amount of computational overhead and/or an amount of bus traffic associated with the performing the media scan operation in comparison to other approaches such as those which do not account for data dispersion. For instance, in some embodiments the method 440 can include performance of a folding operation/media scan operation exclusively on the respective number of planes, pages, and/or memory dice having the at least one of the respective number of valid translation units.

Figure 5:
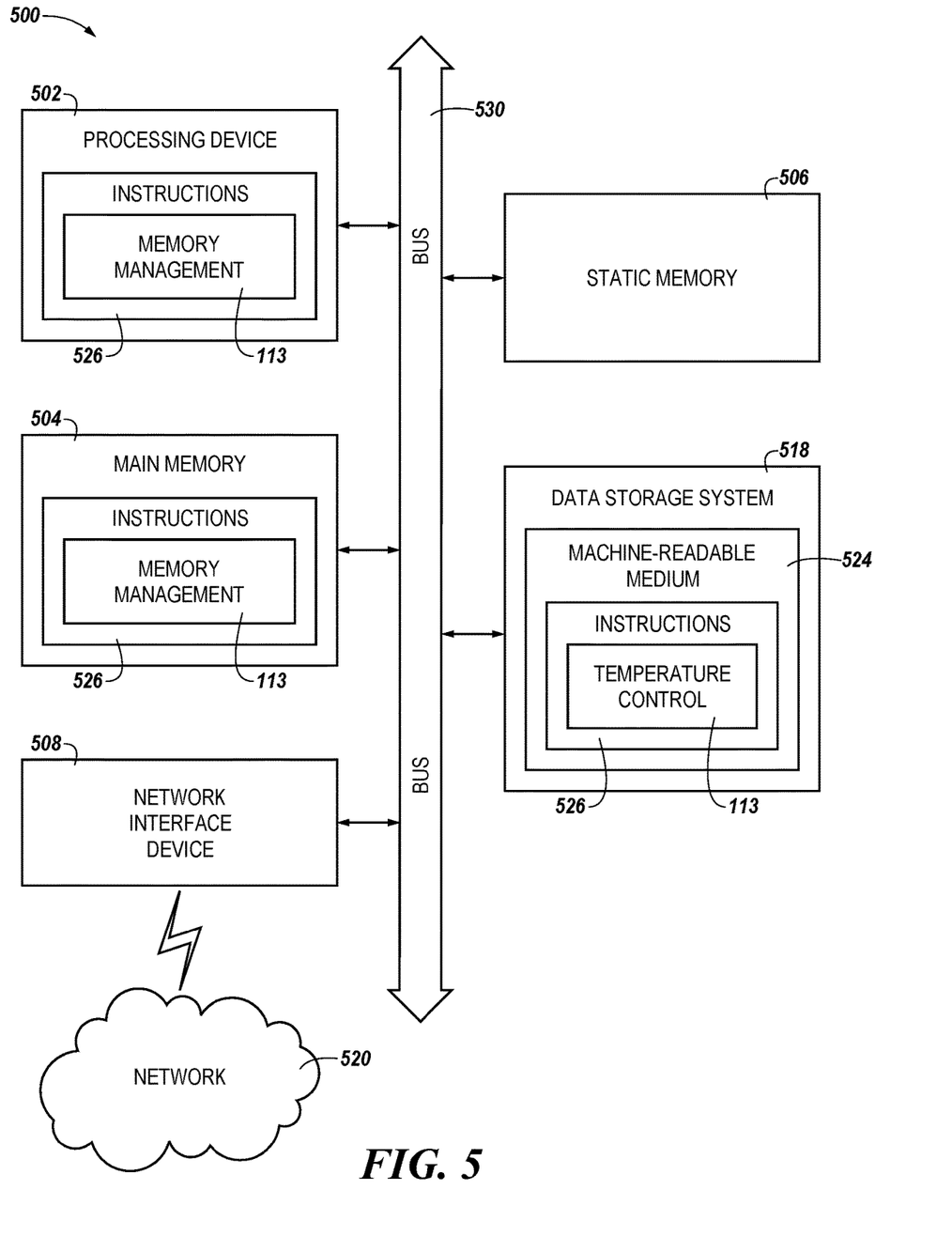
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data dispersion-based memory management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data dispersion-based memory management component (e.g., the data dispersion-based memory management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   determining respective valid translation units counts (VTC) of a plurality of blocks of NAND memory cells;
   determining candidate blocks of NAND memory cells based on the respective VTC;
   determining respective dispersions of valid data portions in pages in each candidate block of the candidate blocks of NAND memory cells;
   based at least on the respective dispersions of the valid data portions in the pages of each respective candidate block, selecting a candidate block of NAND memory cells from the candidate blocks of NAND memory cells, wherein the selected candidate block has the lowest respective dispersion of the valid data portions; and
   performing a folding operation on the selected candidate block of NAND memory cells.

2. The method of claim 1, further comprising determining the respective VTC counts of the plurality of blocks of NAND memory cells by performing a media scan operation.

3. The method of claim 1, wherein performing the folding operation further comprises performing a media scan operation invoking a portion of but not all of the selected candidate block of NAND memory cells.

4. The method of claim 1, wherein performing the folding operation further comprises performing a media scan operation invoking individual block stripes of the selected candidate block of NAND memory cells that include the valid data portions.

5. An apparatus, comprising:
   a data dispersion-based memory management component configured to:
      determine a respective number of and respective locations of valid translation units in a plurality of interleaved NAND memory blocks of a memory component;
      based on the respective number of the valid translation units, determine respective valid translation unit counts (VTC) of the plurality of interleaved NAND memory blocks;
      determine candidate blocks of NAND memory cells based on the respective VTC;
      determine respective dispersions of the valid translation units in pages in each candidate block in the candidate blocks of the plurality of interleaved NAND memory blocks;
      select a candidate block from the candidate blocks of the plurality of interleaved NAND memory blocks, wherein the selected candidate block has the lowest respective dispersion of valid translation unit counts; and
      perform a folding operation on a portion of the selected candidate block.

6. The apparatus of claim 5, wherein each of the interleaved NAND memory blocks are deployed across a plurality of memory dice having a plurality of planes and a plurality of pages.

7. The apparatus of claim 6, wherein the data dispersion-based memory management component is configured to determine the respective dispersion by determination of a respective number of the plurality of pages having at least one of the respective number of valid translation units.

8. The apparatus of claim 7, wherein the data dispersion-based memory management component is configured to perform the folding operation exclusively on the respective number of pages having the at least one of the respective number of valid translation units.

9. A system, comprising:
a memory sub-system comprising a plurality of memory components arranged to form a stackable cross-gridded array of a plurality of superblocks of interleaved NAND memory cells; and
a processing device coupled to the plurality of memory components, the processing device to perform operations comprising:
determining a respective valid translation unit count (VTC) of each superblock of the plurality of superblocks;
determining the respective VTC of a subset of the plurality of superblocks is less than a validity threshold;
based on determining that the respective VTC of the subset of the plurality of superblocks is less than the validity threshold, designating the subset as candidate superblocks;
determining respective dispersions of valid translation units in pages of each of the candidate superblocks;
selecting a candidate superblock based on the respective dispersions of the translation units, wherein the selected candidate superblock has the lowest respective dispersion of valid translation units; and
performing a folding operation on the selected superblock.

10. The system of claim 9, wherein the processing device is to perform operations comprising selecting the candidate superblock based on a type of media management operation to be performed on the candidate superblock.

11. The system of claim 10, wherein the type of media management operation comprises a background garbage collection operation or a foreground garbage collection operation.

12. The system of claim 11, wherein the media management operation comprises the background garbage collection operation.

13. The system of claim 11, wherein the media management operation comprises the foreground garbage collection operation.

14. The system of claim 9, wherein the candidate superblocks comprise a first candidate superblock and a second candidate superblock, wherein the first candidate superblock has a first VTC that is within +/−20 percent of a second VTC of the second candidate superblock.

15. The system of claim 14, wherein the processing device is to perform operations comprising selecting the candidate superblock by:
determining the first candidate superblock or the second candidate superblock has a lower dispersion of valid translation units; and
in response to determining the first candidate superblock or the second candidate superblock has the lower dispersion of valid translation units, selecting the first candidate superblock or the second candidate superblock with the lower dispersion of valid translation units.

* * * * *